Patented June 21, 1932

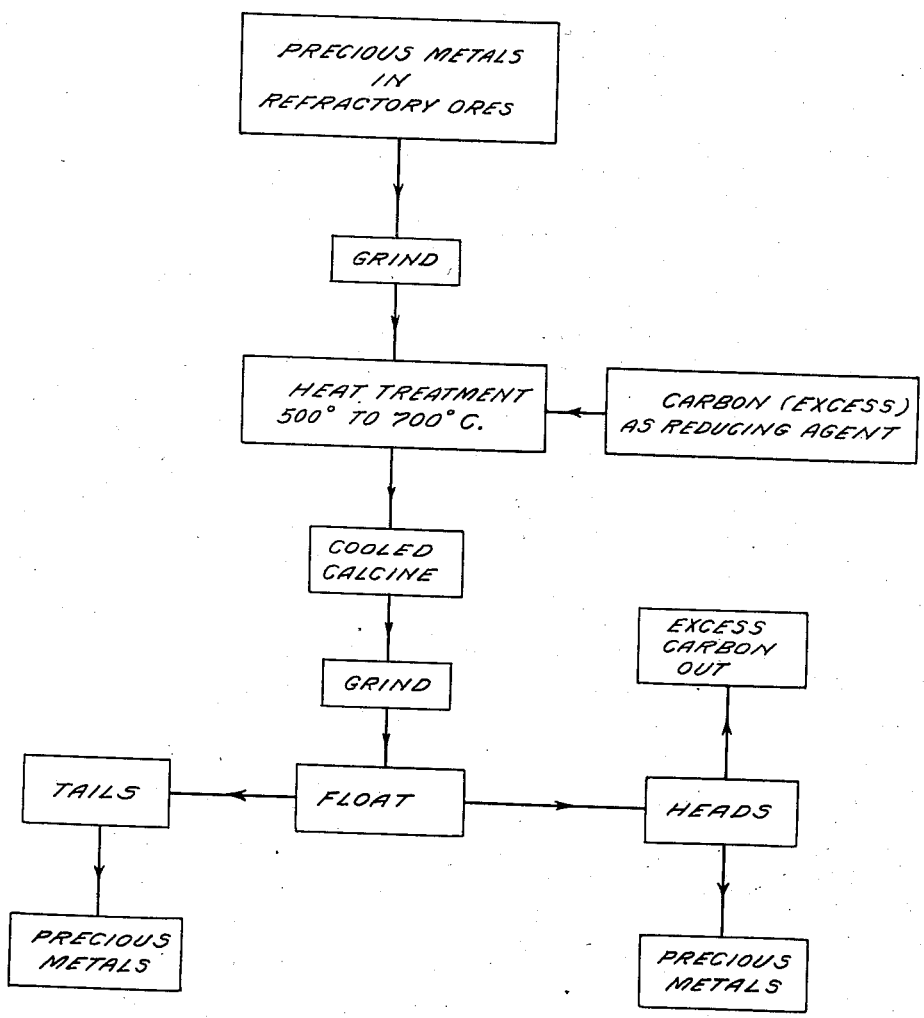

1,864,222

UNITED STATES PATENT OFFICE

SWAIN JOSEPH SWAINSON, OF WESTFIELD, AND ARVID EMIL ANDERSON, OF ELIZABETH, NEW JERSEY, ASSIGNORS TO AMERICAN CYANAMID COMPANY, OF NEW YORK, N. Y., A CORPORATION OF MAINE

TREATMENT OF PRECIOUS METAL BEARING ORES

Application filed June 13, 1931. Serial No. 544,082.

The present invention relates to a method of recovering precious metals from ores of a refractory nature.

Specifically the invention is concerned with the treatment of gold and silver ores, which contain these metals in refractory combination with manganese, in such a manner as to make the precious metal content amenable to cyanidation.

The refractory nature of certain manganese silver compounds and manganese silver ores containing gold is very pronounced and such ores must be subjected to special treatment to make the precious metal content thereof amenable to cyanidation or subsequent flotation. It has been proposed heretofore to subject such ores to heat treatment in a reducing atmosphere where producer gas was used not only to produce the reducing atmosphere but as the actual reducing agent. This method is objectionable in that it requires considerable and cumbersome apparatus, is limited to such localities where producer gas is available and is not always productive of uniform and efficient results.

The principal object of the present invention is to treat ores of the above nature by a method which may be universally applicable to all locations and which leaves the precious metal content in such form as to be thoroughly and completely amenable to such recovery processes as cyanidation.

In carrying out the invention in its preferred form, the ground ore is subjected to heat treatment at temperatures ranging from 500° to 700° C. in a rotary kiln type furnace, using carbon as the reducing agent. It is preferable to use an amount of carbon in excess of that required for complete reduction of the higher oxides of manganese to manganous oxide. The excess carbon creates the reducing atmosphere necessary for the reduction and also prevents re-oxidation. After the heat treatment operation, which may run from twenty minutes to an hour, the calcine is cooled, further ground if necessary, and subjected to a flotation operation to remove the excess carbon. A portion of the precious metals may be recovered in the flotation operation. The tailings from this step in the procedure are then subjected to cyanidation in the usual manner for recovery of the precious metal content. Actual practice of this method has resulted in increasing the silver extraction on such ores 20% above that obtained by direct cyanidation, and the extraction of the gold from such ore was also increased.

A typical ore analysis is indicated below. While it is recognized that the precious metal content of this ore is somewhat low, yet the successful extraction of the precious metal content therefrom makes apparent the practicability of the process of this invention.

Analysis of ore

| | | |
|---|---|---|
| Au | oz./ton | 0.455 |
| Ag | oz./ton | 10.17 |
| Cu | per cent | 0.04 |
| Zn | per cent | 0.29 |
| Pb | per cent | 0.04 |
| Mn | per cent | 1.09 |
| Fe | per cent | 2.60 |
| Insol | per cent | 87.30 |
| S | per cent | .11 |

The figure constitutes a flow sheet showing the ore treatment according to the invention.

In following the procedure on the above ore, the material was stage crushed to minus 20 mesh and mixed with carbon. This carbon may take the form of powdered coal, charcoal or coke with satisfactory results. From 1% to 4% carbon by weight has been used with successful results on ores of the above type, it only being necessary that an excess amount of carbon be used.

The carbon-ore mix was then transferred to a rotary furnace and the temperature of the charge raised to 700° C. and maintained at that point for thirty minutes. While a temperature of 700° C. was used, yet obviously the invention is not to be limited thereto as it is only necessary that a temperature sufficient for reduction be maintained. This ordinarily will be from 500° to 700° C. The time element should be such as to permit the higher manganese oxides to be reduced to the manganous state.

The calcine from the above operation was permitted to cool in the furnace and then ground with water at 67% solids to minus 65 mesh. This pulp was then transferred to a mechanically agitated subaerated type flotation machine where a flotation operation was carried on and a froth collected. This froth contained practically all of the excess carbon and a portion of the precious metals. No special flotation reagent is required as satisfactory results were obtained by the use of kerosene, pine oil, and the like. The grinding and flotation operations may be carried on in a cyanide solution if desired.

The tailings from the flotation treatment were then subjected to the ordinary cyanidation treatment for the recovery of the precious metals.

It would ordinarily be expected that when using carbon as a reducing agent for the precious metal manganese compounds, there would be danger of subsequent precipitation of the precious metals during cyanidation. However, since the excess carbon was floated away, the hazard of re-precipitating the precious metals was eliminated. As a result of the above treatment the recovery of the gold and silver from the ore was materially increased over direct cyanidation without the heat and flotation treatment.

Obviously this treatment may be used on any manganese silver ore or precious metal manganese ores which are not amenable to either flotation or cyanidation with efficient recovery of the precious metal content.

While the invention has been described with particular reference to a specific ore and particular steps, yet obviously the invention is not to be limited thereto but is to be construed broadly and restricted only by the scope of the claims.

We claim:

1. A method of recovering precious metals from ores containing them in refractory combination with manganese, which consists in subjecting the same to a reducing heat treatment using a solid reducing agent, removing the excess reducing agent by flotation after the heat treatment and recovering the precious metals by cyanidation.

2. A method of recovering precious metals from ores containing them in refractory combination with manganese, which consists in subjecting the same to a reducing heat treatment using carbon as a reducing agent, removing the excess carbon by a flotation operation and recovering the precious metals by cyanidation.

3. A method of recovering precious metals from ores containing them in refractory combination with manganese, which consists in subjecting the same to a reducing heat treatment at a temperature of 500° to 700° C. using carbon as a reducing agent, removing the excess carbon by a flotation operation and recovering the precious metals by cyanidation.

4. A method of recovering precious metals from ores containing them in refractory combination with manganese, which consists in subjecting the same to a reducing temperature in the presence of carbon as the reducing agent until the higher oxides of manganese have been reduced to the manganous state, removing the excess carbon by a flotation operation and recovering the precious metals by cyanidation.

5. A method of recovering precious metals from ores containing them in refractory combination with manganese, which consists in subjecting the same to a heat treatment at 700° C. in the presence of from 1% to 4% carbon, removing the excess carbon by a flotation operation and recovering the precious metals by cyanidation.

6. A method of recovering silver and gold from ores containing them in refractory combination with manganese, which consists in subjecting the same to a reducing heat treatment at substantially 700° C. in the presence of carbon as a reducing agent in an amount more than is required to reduce the higher oxides of manganese to the manganous state, removing the excess carbon by a flotation operation and subjecting the tailings from the flotation operation to cyanidation to recover the precious metal content thereof.

In witness whereof, we have hereinto subscribed our names this 10th day of June 1931.

SWAIN JOSEPH SWAINSON.
ARVID EMIL ANDERSON.